United States Patent [19]

Mizzy et al.

[11] 3,859,996

[45] Jan. 14, 1975

[54] MULTI-DOSE INJECTOR

[75] Inventors: A. Robert Mizzy, New York, N.Y.;
Vito L. Pierannunzi, Clifton Forge, Va.

[73] Assignee: Mizzy, Inc., Clifton Forge, Va.

[22] Filed: July 18, 1973

[21] Appl. No.: 380,357

[52] U.S. Cl..................... 128/173 H, 41/67, 41/352
[51] Int. Cl............................................. A61m 5/30
[58] Field of Search......... 128/173 H, 173 R, 173.1, 128/214.2, 218 A, 239; 141/346, 351, 352, 67; 227/8

[56] References Cited
UNITED STATES PATENTS

| | | | |
|---|---|---|---|
| 3,057,349 | 10/1962 | Ismach............................ | 128/173 H |
| 3,515,130 | 6/1970 | Tsujino........................... | 128/173 H |
| 3,526,225 | 9/1970 | Isobe.............................. | 128/173 H |

*Primary Examiner*—Richard A. Gaudet
*Assistant Examiner*—Henry J. Recla
*Attorney, Agent, or Firm*—Arthur B. Colvin

[57] ABSTRACT

An improved multi-dose injector comprising a body portion, an ejector nozzle mounted at one end of said body portion, including a discharge orifice, an exit passage in said body portion leading to said orifice, powerized means for ejecting measured doses of liquid under pressure through the exit passage and out of the orifice against the epidermis of the recipient, the apparatus being characterized by a pressure sensitive trigger mechanism whereby triggering of the dose releasing apparatus is effected only after a predetermined pressure of the trigger mechanism against the subject is sensed. The trigger apparatus assures optimal and predictable administration of a medicament by initiating an operative cycle only when the injector is pressed against the subject with a selected force, while preventing accidental or inadvertent firing. In addition, the novel trigger mechanism reduces the likelihood of slippage or movement of the apparatus relative to the subject during administration of a dosage.

17 Claims, 11 Drawing Figures

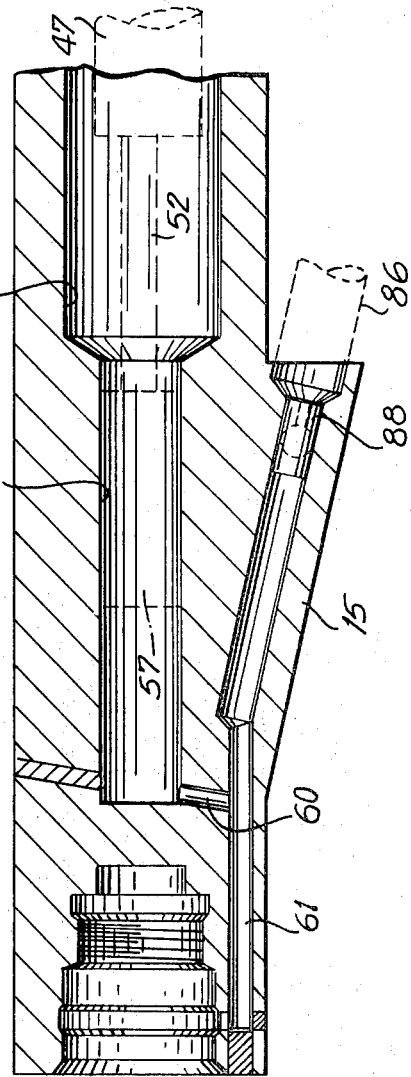
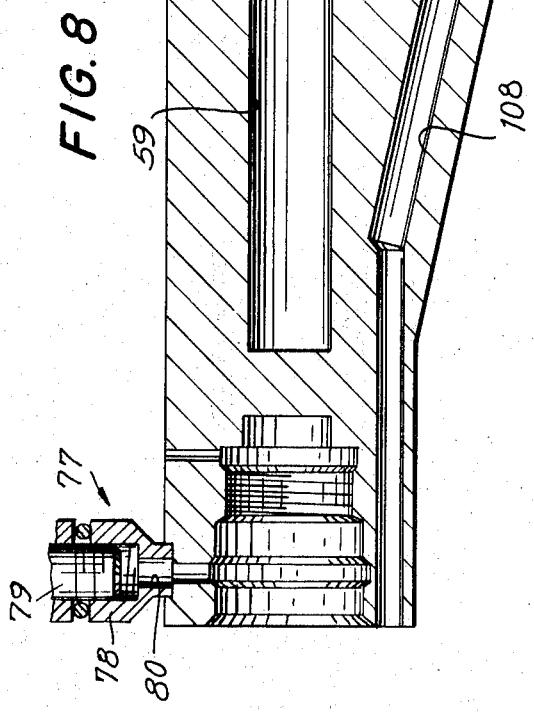
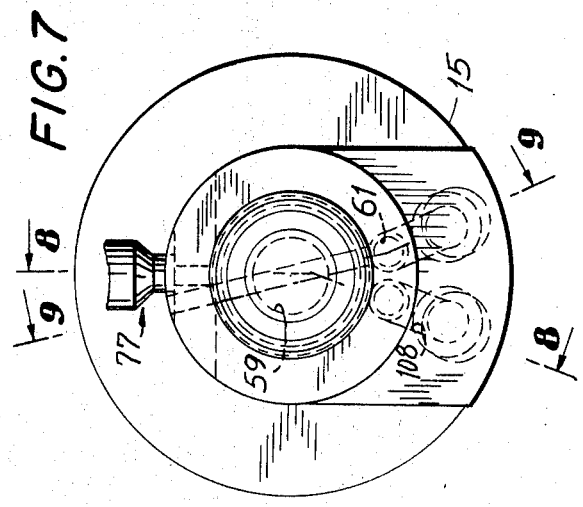
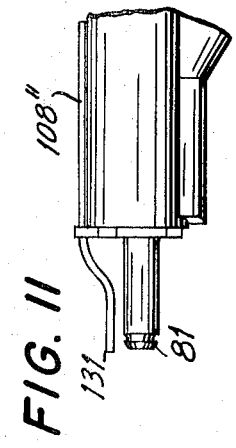

MULTI-DOSE INJECTOR

BACKGROUND OF THE INVENTION

1. Field of the Invention

The present invention is in the field of multi-dose pressure injectors, relating specifically to an apparatus wherein a dose of liquid medicament is expelled under extremely high pressure through an orifice disposed against or adjacent the epidermis of an individual or animal to be treated. More particularly, the apparatus of the present invention is directed to the field of the dosing apparatus of the type described having an automatic pressure sensitive triggering mechanism.

2. The Prior Art

It is known to provide, in lieu of the conventional hypodermic injector wherein a hollow needle coupled to a syringe is inserted into the body of the subject and a medicament is introduced through the needle, a dosing apparatus wherein a stream of medicament under extremely high pressure is directed against the skin of the subject. In such pressure injector it is known that the total amount of fluid expelled may not be effectively introduced into the body of the subject or may penetrate to varying depths in the body of the subject with consequent varying physiological impact.

It is obviously desirable that the dosage administered be predictable and that the penetration of such dosage be subject to repetition during each operating cycle.

It has been determined that in addition to the speed of the expelled liquid, the pressure with which the orifice is forced against the epidermis of the subject of the spacing of the orifice from the epidermis of the subject is a significant factor in determining the percentage of the expelled dosage which is actually received by the subject and the penetration depth of the dosage into the body of the recipient.

Heretofore it has been conventional practice to activate the injecting apparatus by depressing a trigger or some comparable control. Such means of activating an injector is effective where the subject is immobile. However, in many cases where the subjects are animated and uncooperative, as in the case of children, certain animals, fowl, etc., it has been found that a hand trigger injector is not entirely satisfactory.

Where fowl are injected, for instance, there is a constant tendency, absent a time-consuming immobilization of the fowl, for the fowl to move or shift during administration of a dosage, with the result that the amount of medicament received is unpredictable. Obviously, it is impractical to exert substantial pressure against the fowl, since a tender, young chicken, for example, may easily be injured.

A further difficulty in utilizing pressure injectors for uncooperative subjects lies in the fact that any relative movement between the subject and the injecting apparatus occuring during administration of a dose creates substantial trauma since the fluid, under extreme pressure, acts like a knife and it would be desirable, at the instant of injection, to have no relative movement.

Actuation of the manual trigger of a conventional injector while pressing the discharge orifice against the skin, feathers or hide of an unwilling subject is recognized to be a difficult procedure resulting in administration of unpredictable doses and occasional injury to the subject.

SUMMARY OF THE INVENTION

The present invention is directed to an injector apparatus of the pressure jet type including a pressure sensitive actuating mechanism wherein administration of a dosage in initiated only after the discharge end of the apparatus is urged against the subject with a predetermined force.

Preferably, the pressure sensitive triggering mechanism includes a slide carried by the injector apparatus, which slide is movable relative to the apparatus in a direction restricted to one which is parallel to the axis of the medicament jet orifice.

Optionally, the force required to trigger a dosage administration may be varied.

Preferably, substantial relative movement between the trigger and the body of the apparatus must be effected to initiate or permit actuation of the device whereby the likelihood of lateral slippage and consequent trauma to the subject in the course of administration of a dose is greatly reduced.

By controlling the pressure required to trigger the apparatus to a repeatable value, a predictable dosage penetration is achieved. Moreover, rapid firing sequences are made possible through the use of the pressure triggering mechanism.

Accordingly, it is an object of the invention to provide an improved multi-dose injector apparatus including a pressure sensitive triggering mechanism for initiating the administration of a dose responsive to a predetermined pressure being exerted by the apparatus against the subject.

A further object of the invention is the provision of a device of the class described wherein the pressure sensing is effected without the use of electrical apparatus contacting the subject, whereby the possibility of electric shock is eliminated.

A further object of the invention is the provision of a device of the type described wherein the pressure sensitive triggering apparatus functions, in addition, to reduce the likelihood of lateral movement during administration of the dose.

Still a further object of the invention is the provision of devices of the type described susceptible of being used for rapid fire innoculation of fowl or other domestic animals as well as humans.

Still a further object of the invention is the provision of an apparatus of the type described wherein the pressure with which the innoculant is expelled may be readily varied.

To attain these objects and such further objects as may appear herein or be hereinafter pointed out, reference is made to the accompanying drawings, forming a part hereof, in which:

FIG. 7 is a front view of the injector tip;

FIG. 8 is a section taken on lines 8—8 of FIG. 7;

FIG. 9 is a section taken on lines 9—9 of FIG. 7;

FIG. 10 is a diagrammatic view of a modification of the invention; and

FIG. 11 is a diagrammatic view of a further modification of the invention.

Figure 1:
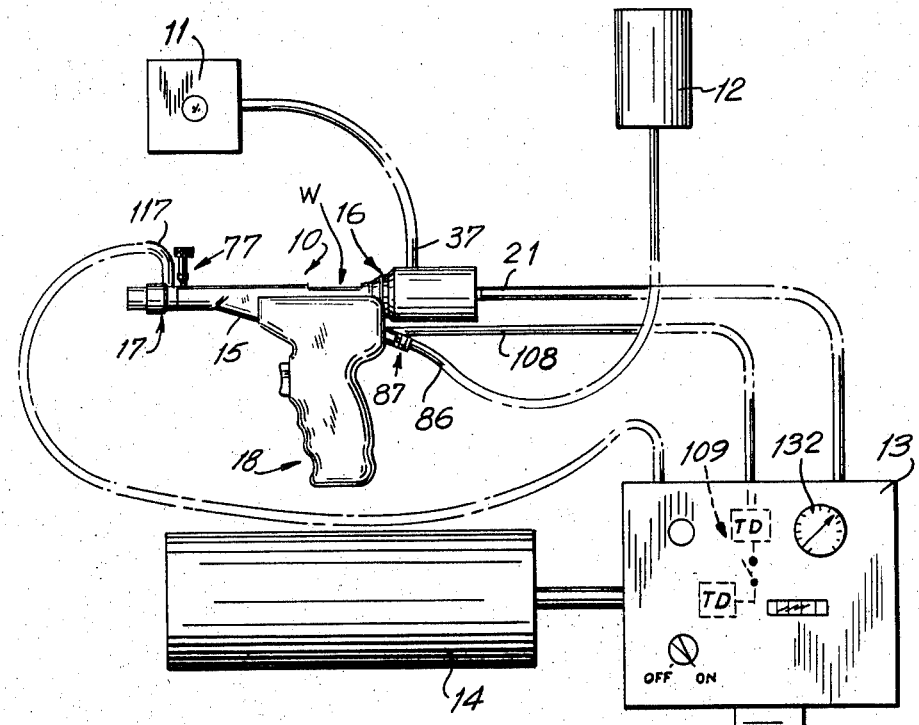
FIG. 1 is a diagrammatic representation of the system and auxiliary equipment employing the injector in accordance with the invention.
Figure 2:
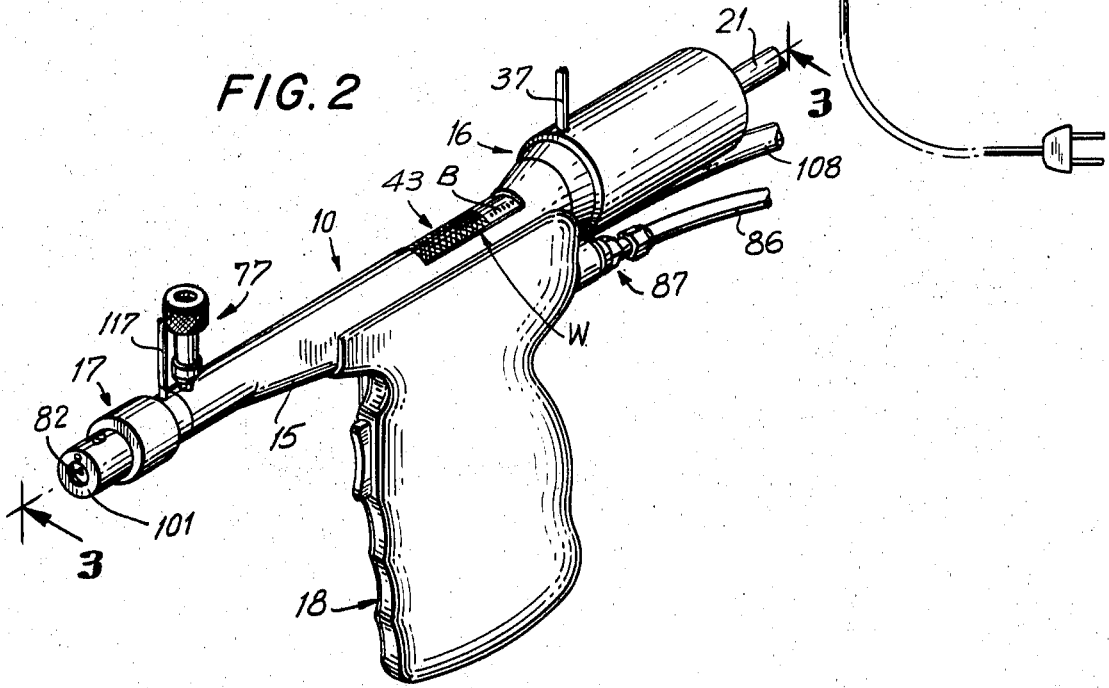
FIG. 2 is a perspective view of the injector.

Referring now to the drawings, there is shown in FIG. 1 an injector mechanism including injector apparatus 10, indicator 11, medicament receptacle 12, control mechanism 13 and compressed air supply 14.

Figure 3:
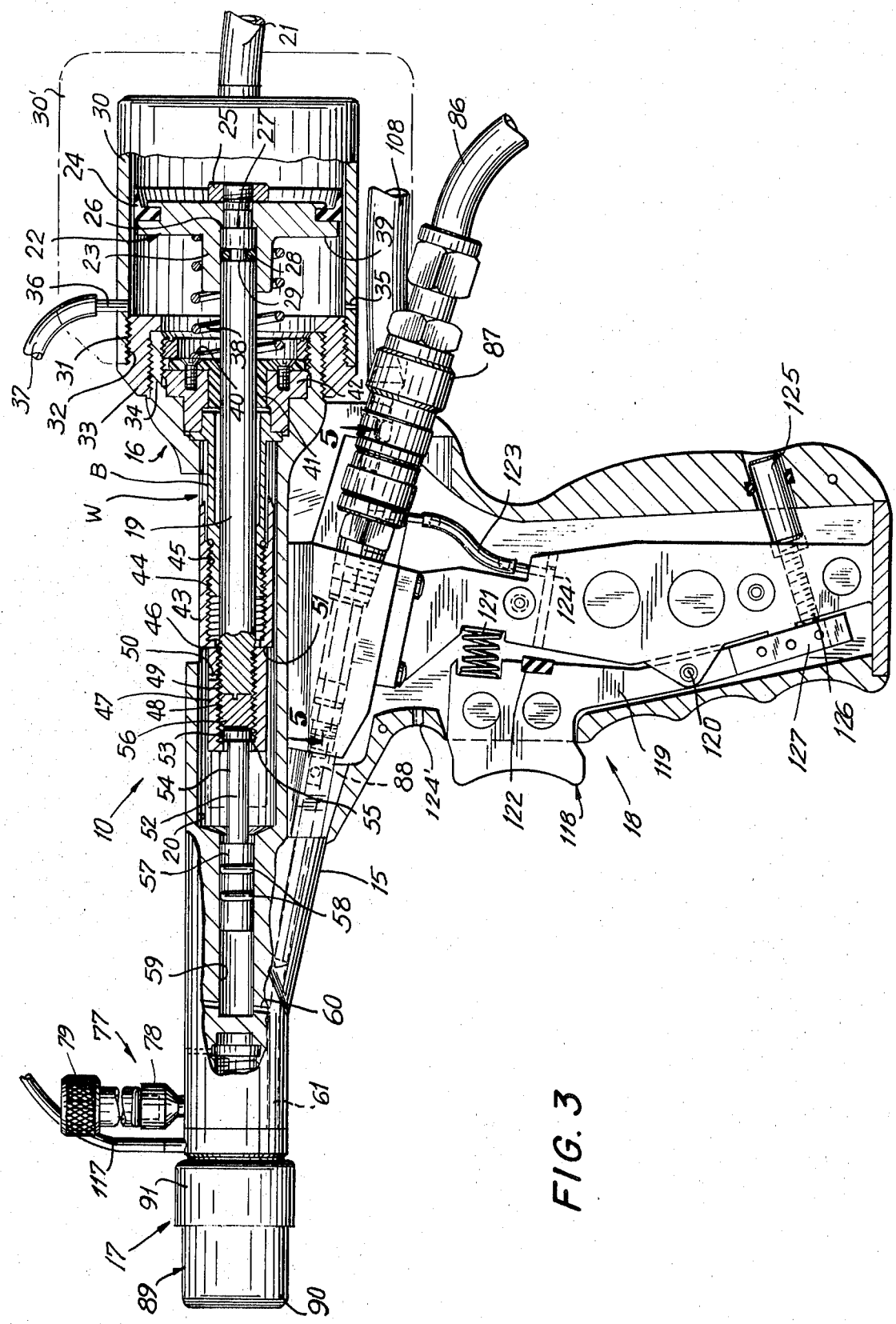
FIG. 3 is a vertical cross section taken generally along lines 3—3 of FIG. 2.

Referring now to FIG. 3, the injector 10 includes a cast metal body or housing 15 incorporating a pressure generator mechanism 16, trigger mechanism 17 and a control mechanism 18.

The pressure mechanism 16 includes an axially shiftable piston rod 19 movable within a bore 20, movement of the piston rod 19 being controlled by a supply of compressed air from source 14 admitted to the interior of the injector through a conduit 21 connected by appropriate control mechanism to source 14.

To the piston rod 19 there is mounted a drive piston assembly 22, including a piston body 23 and a cup seal or chevron gasket 24. The piston body 23 is fixed to the rod 19 by a lock nut 25, the nut 25 clamping a reduced diameter portion 26 of the piston body against an annular shoulder 27 formed on the rod. Preferably, an O-ring 28 is seated within groove 29 on the piston rod to prevent leakage.

The cup seal 24 rides within a pressure cylinder 30 having a forward threaded end portion 31 received on complemental threads 32 of a collar 33, which is in turn internally threaded, such internal threads being received on a complementally threaded end portion 34 of the housing 15.

It will be appreciated that air admitted through the conduit 21 will enter behind the piston head 22 and urge the piston head and its associated piston rod 19 through a driven stroke (from right to left as viewed in FIG. 3). A bleed aperature 35 is provided in the cylinder 30 to vent air ahead of the piston in the course of a driven stroke.

The cylinder 30 optionally but preferably is provided with a nipple 36 connected to conduit 37 leading to an indicator light assembly, the assembly being responsive to pressure in conduit 37 for flashing an indicator light 11, signifying the completion of a driving stroke.

The piston head assembly 22 and its associated rod 19 are normally biased to a righthandward position, as shown in FIG. 3, by a coil spring 38 having its rear end 39' biased against the rear face 39 of the piston head 22, and its forward end 40 biased against a nylon bushing 41 fastened to element 42 supported in the housing.

A knurled adjustment collar 43 having an internal thread 44 is connected to a complemental external thread 45 formed on the housing 15. The knurled adjustment member 43 includes a forwardly directed stop shoulder 46. The piston rod assembly includes a retainer collar 47 having an internal thread 48 mounted on the externally threaded portion 49 at the lead end of the rod. Locking pin or set screw 50 may be employed to prevent relative rotation between the collar 47 and the rod 19.

It will be observed that the retracted limiting position between the rod 19 and the housing 15 is established by the engagement of rearwardly directed face 51 of the retainer collar 47 against the forward face 46 of the knurled adjustment member. It will thus be appreciated that the return stroke of the piston may be varied in accordance with the adjusted lengthwise position of the knurled member 43 relative to the housing. The retainer collar 47, in addition, forms a means of loosely securing the pressure or medicament ejector piston 52 to the rod 19.

Pressure piston 52 includes an enlarged boss 53, adjacent which boss is formed a narrow shank 54. The retaining collar 47 is provided with an end aperture 55 of a size sufficiently large to permit the passage therethrough of the shank 54 but not the boss 53. It is important to note that substantial circumferential clearance is provided between the shank 54 and the aperture 55 in the retainer collar 47 so that a relative transverse movement between the noted parts is possible.

A locking plug 56 may be engaged with the internal threads 48 of the collar 47, to limit the amount of relative axial movement permitted between the pressure piston 52 and the piston rod 19.

The pressure piston 52 includes an elongated head portion 57 having grooves receiving O-rings 58. The O-rings ride with minimal clearances within a pressure chamber 59 formed in the housing.

It will be appreciated that the clearance or transverse movements permitted between the pressure piston and the retainer collar 47 assure that no binding or excess wear will occur between the O-rings 58 of piston 52 and the bore 59 since the guiding influence is effected between the said piston and chamber, the connection between the pressure piston 52 and piston rod 19 functioning merely to communicate axial movement of the rod to the piston 52.

Figure 4:
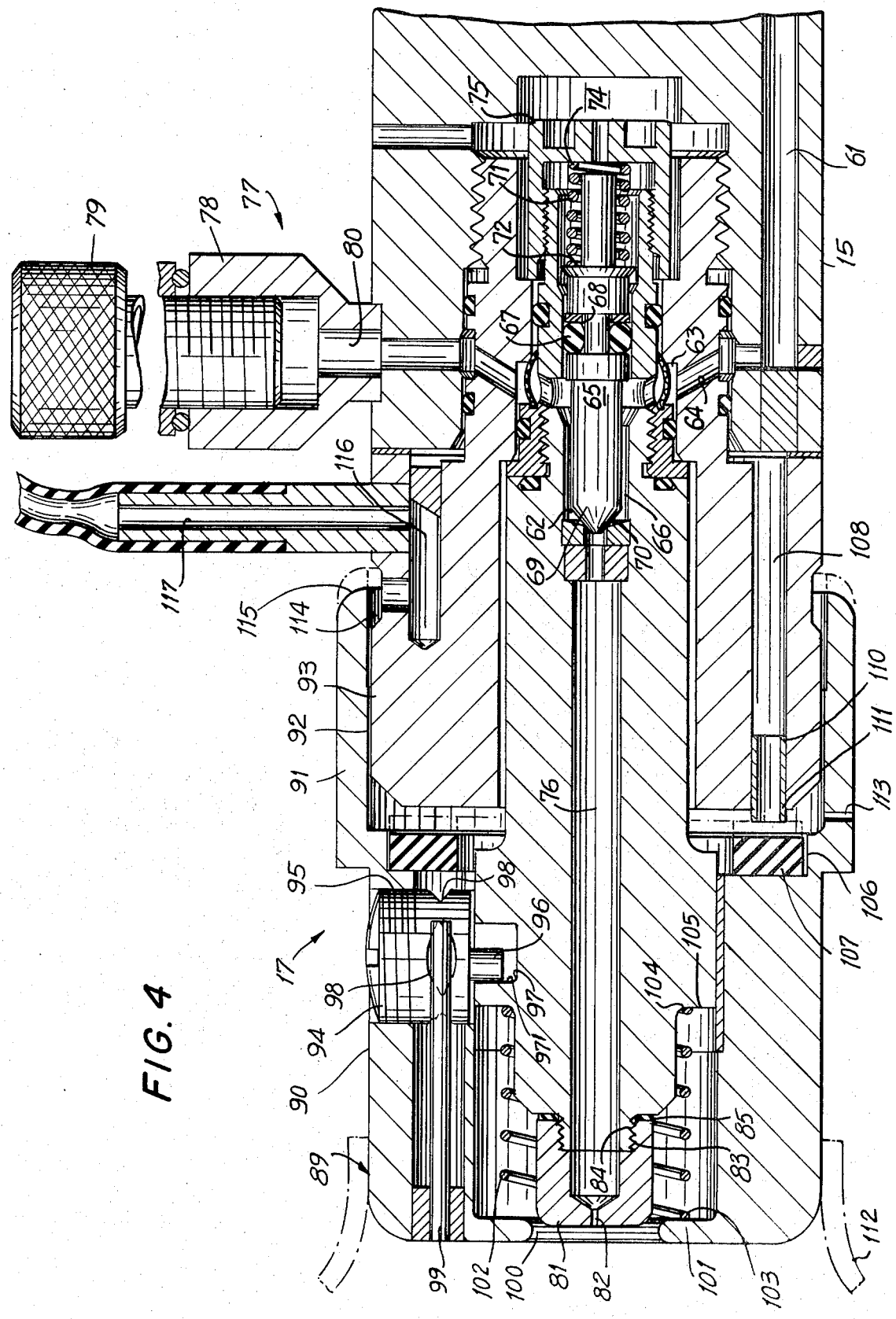
FIG. 4 is an enlarged fragmentary sectional view of the tip of the injector.
Figure 5:
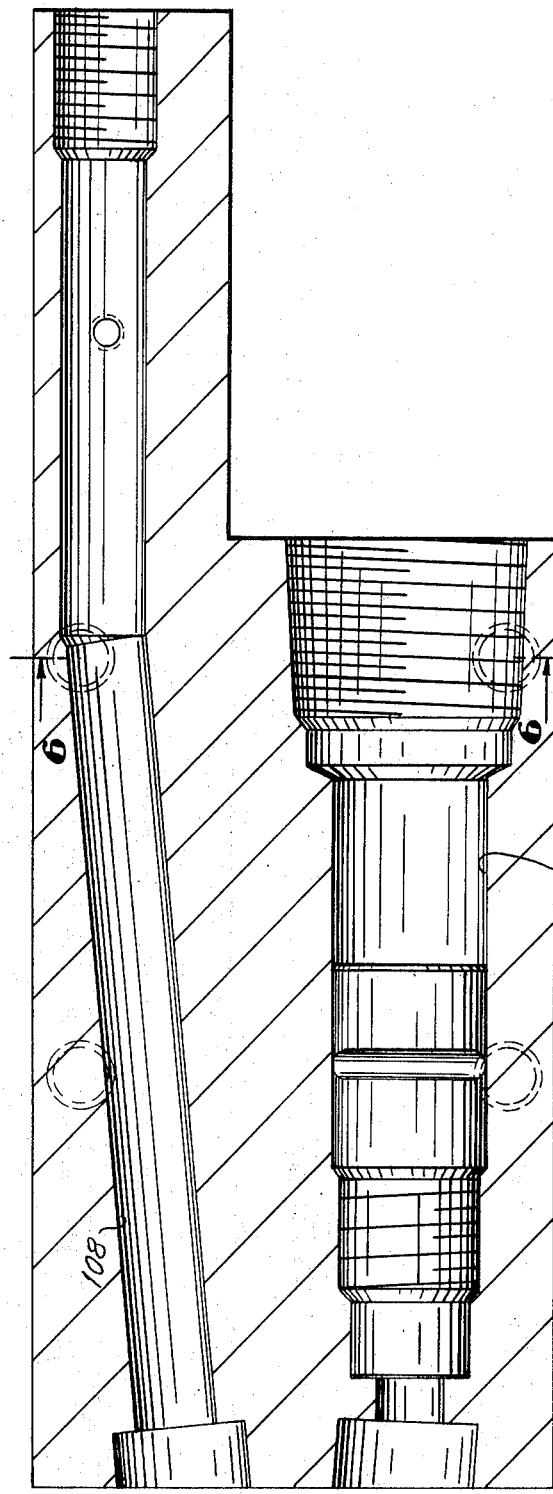
FIG. 5 is a horizontal cross sectional view taken generally along the lines 5—5 of FIG. 3.
Figure 6:
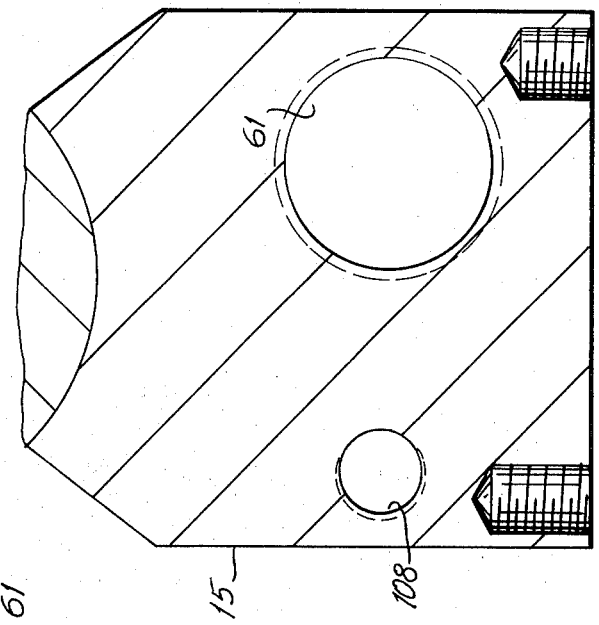
FIG. 6 is a sectional view taken along lines 6—6 of FIG. 5.

From the above it will be observed that medicament which is introduced into the chamber 59 which functions as a reservoir, in a manner hereafter to be set forth is, upon an operative stroke, e.g. a right to left stroke of the piston head 57, as viewed in FIG. 3, forced outwardly through lateral passage 60 into medicament pressure passage 61, the passage 61 leading to the medicament dispensing chamber 62, FIG. 4, via a lateral passage 64 and an annular recess 63.

There will next be described the valving mechanism which assures that medicament introduced into the chamber 62 by an operative stroke of the piston 52 may be ejected only when pressure in the chamber 62 reaches a selected high level sufficient to cause the fluid to be introduced through the skin of the subject.

The valving mechanism includes a shiftable valve stem 65 slidable in an axially extending bore 66 in the housing. The valve stem includes a seal portion or head defined by O-ring 67 riding within mounting groove 68. The valve includes a sealing nose 69 of tapered configuration, the nose being normally biased to seating engagement within a valve seat 70 mounted in the housing by a sealing spring 71. Spring 71 has its forward end 72 pressed against an annular shoulder 73 forming a portion of the valve body, the rear end 74 of the spring being biased against a spring locking plug 75 threaded into the housing.

It will thus be seen from FIG. 4 that the nose 69 of the valve normally isolates the medicament exit chamber 76 from the medicament supply conduit 61 unless and until the pressure within the conduit 61 and hence, in the annular recess 63 reaches a predetermined level sufficiently high to shift the valve body to the right, as viewed in FIG. 4, permitting the flow of medicament fluids to the exit chamber 76. Interposition of the spring valve assembly in the discharge circuit assures that medicament will discharge in a sudden burst corresponding to the sudden unseating of the valve.

In order to permit cleaning of the annular chamber 63, there is provided a medicament bleed assembly 77 including a nipple 78 fixed to the housing, having a removable plug 79. When it is desired to clean out the chamber, the plug 79 may be removed and cleaning fluid may be introduced through the passage 61, whereupon all residue and excess medicament will be flushed through the exit orifice 80 of nipple 78.

To the forward end of the medicament exit chamber 76, which functions as a temporary reservoir to store medicament to be injected at the next preceding piston stroke, there is fixed a nozzle 81 having formed therein a reduced diameter orifice 82. The nozzle 81 is threadedly connected at 83 to a complementally threaded lead portion 84 of the housing, a gasket 85 being sandwiched between the nozzle and housing to prevent leakage.

When fluid under high pressure is pumped into the exit chamber 76, a jet of fluid at extremely high speed will be expelled from the orifice 82, the speed being calculated to be sufficient to penetrate the skin or hide of the subject.

The medicament reservoir 59 is maintained filled with medicament at all times, the filling being effected through a medicament supply line 86 connected to the medicament supply 12.

The medicament supply line 86 is led through a coupling assembly 87, a check valve 88, FIG. 9, being interposed between the line 86 and the reservoir 59 whereby, upon retraction of the piston head 57, medicament is induced to flow into the reservoir 59 to charge the latter but return flow of medicament upon generation of high pressures within the reservoir 59 back to the line 86 is prevented.

There will next be described the mechanism employed to initiate a dose ejecting cycle.

Triggering or initiation of the cycle, as previously noted, may be automatically effected responsive to pressing of the lead end of the triggering mechanism 17 against the skin or hide of the subject. To this end, a trigger slide 89 is mounted at the front end of the housing surrounding the ejection nozzle 81. The slide is comprised of a generally cup-like element 90, including a cylindrical trailing portion 91 formed with an internal cylindrical bore 92. The housing includes a forwardly directed cylindrical surface 93, outwardly lapped by cylindrical bore 92 of the slide.

The slide 89 is movably mounted to the housing by a control and lock screw 94 threaded into an aperture 95 formed in the slide. An eccentric pin 96 projects downwardly from the control and lock screw 94, the pin 96, in its inwardly threaded position, lying within a transversely extending slot or recess 97 formed in the body portion, the slot including a front abutment shoulder 97'.

The control screw 94 may be locked in one of two selected position, one 90° degrees offset from the other. For this purpose, detent portions 98 (only one being shown) are provided in the side of the locking screw. A blade spring 99 having a side portion yieldingly biased against the side of the screw 94 establishes the position of the pin either in the solid line position, or in a position displaced 90 degrees, depending on which of the two detents 98 is engaged by the spring 99.

It will be appreciated that when the pin 96 is retained in its solid line position, the entire slide 89 may be shifted rearwardly within the clearances provided by the recess 97. However, when the screw 94 is rotated 90 degrees from such solid line position, the pin 96 by reason of its eccentricity relative to the axis of rotation of screw 94 will, since it is engaging against shoulder of screw 94, cam the slide rearwardly to the dot and dash position 97', the slide being then locked in said manual position by engagement of blade spring 99 in an approximately positioned detent 98, with gasket 107 sealing outlet 111.

The slide 89 includes a central aperture 100 surrounding the nozzle 81, the aperture being defined by an inwardly, radially extending shoulder portion 101. A coil spring 102 has its forward end 103 biased against the shoulder 101, the rearward end 104 of the coil spring being seated against a forwardly directed stop 105 on the housing. Thus, the spring 102 will be seen to press the slide to a normal forward position, assuming lock screw 94 to be in the solid line position of FIG. 4. The slide is provided with a rearwardly directed recess 106, within which recess is seated the annular gasket 107.

There is formed in the housing a trigger air conduit 108, which conduit is connected to a source of air under low pressure and to a pressure sensing switch 109 in the control 13. The switch is set to trigger a cycling of the apparatus (by introducing air into conduit 21) responsive to a preselected sense pressure increase in the conduit 108 to which it is connected.

The conduit 108 is connected to a fitting 110 on the housing, the fitting including the forwardly facing outlet end 111, the end 111 being disposed in the path of the gasket 107 carried by the trigger actuator slide.

The slide 89 includes a bleed aperture 113, allowing the air in conduit 108 to bleed to the atmosphere except when the gasket 107 is in sealing position, as hereafter noted.

It will be observed that when a pressure is exerted against the forward end of the slide or against a mask 112 fixed to the slide and extending forwardly thereof, or when the control screw 94 is rotated to the manual position, the slide will be shifted to the right, dot-and-dash position as shown in FIG. 4, whereat the gasket 107 will block the end 111. Assuming the manual trigger mechanism to be described, to be properly set, the resultant increase in air pressure in conduit 108 will actuate the switch 109, causing an operative cycle.

Preferably, in order that detritus not block the movement of the slide 89 or increase the pressure necessary to shift the slide rearwardly to triggering position, an enlarged recess 114 is formed in the trailing end 115 of the slide. A passage 116 is formed in the body portion or housing, air from an inlet conduit 117 being constantly introduced into the passage 116 and hence, to the annular recess 114 to block any detritus accumulation.

There has been described the means for assuring that activation may be effected only when the apparatus is pressed against a subject. Utilizing such means in combination with a manual trigger assembly hereafter described, it is possible to operate the apparatus selectively by a combination of manual triggering activation and pressure against the subject or by adjustment of the manual trigger device for very rapid usage, as in innoculating a flock of chickens, to eliminate use of the manual trigger completely, relying solely upon pressure against the subject for injection initiation. The manual trigger assembly 118 is located in the handle 18 and includes a trigger lever 119, fulcrumed on the pin 120 and normally biased to a forward or extending position by spring 121. The trigger includes a gasket member 122. A takeoff tube or conduit 123 connected to the trigger air line 108 leads to a blind passage 124 in the control assembly 18.

It will be appreciated from inspection of FIG. 3, that when manual pressure is exerted on the trigger 18, the gasket 122 blocks escape of air from the passage 124, whereupon the only outlet for escape of air from the trigger conduit 108 is from outlet 111 through the bleed orifice 113 of the slide 89. Thus, initiation of an injection stroke is possible only when both of the exit passages for the trigger air in conduit 108 are blocked, namely the passage 124 which is closed by actuation of trigger 118 and the outlet 111 which is closed by movement of the slide to induce the necessary pressure buildup in line 108.

For automatic triggering operation there is provided a locking screw 125 having a nose portion 126 engaging the bottom portion 127 of lever 119, an inward threading of locking screw 125 causing the lever to be pivoted in such manner that the gasket 122 is maintained in sealing relation of the passage 124 so that only the bleed port 113 is open for relief of the air pressure in line 108. With the parts thus positioned, a dosage is administered each time the apparatus is pressed against a subject.

The various controls permit great flexibility in the manner of use of the device, i.e., with the trigger 118 in its active (movable) position, the apparatus may be triggered by pressing the slide against the subject and pulling the trigger, it being assured under such circumstances that in the absence of sufficient pressure against the subject and in the absence of triggering pressure, no innoculating dosage will be administered.

As an alternate manner of operation, the trigger 118 may be maintained closed under manual pressure and the operation may be triggered merely by pressing the slide against the subject, an initiating stroke being effected responsive to sensing of a sufficient rearward movement of the slide in the manner aforesaid.

The automatic (e.g. manual trigger deactivated) method of operation has already been described.

In addition, it is also possible to utilize only the trigger 118 to cause an ejection cycle to be initiated. In such case the lock screw 94 is rotated to shift the slide 89 to the dot-and-dash position shown in FIG. 4 so that the outlet end 111 of line 108 will be sealed. Thus, only passage 124 is open to permit bleed of air through bleed port 124' (FIG. 3).

Consequently, it is only when trigger 118 is pressed and gasket 122 seals passageway 124 that pressure buildup will occur in line 108 to initiate the ejection cycle.

Referring to FIG. 3, the apparatus may readily be converted to modify the force with which the innoculant is discharged by the substitution for the driver piston assembly 22 and cylinder 30 of an assembly having a greater cross section. For this purpose there is shown in dot-and-dash lines an enlarged driver cylinder 30', it being understood that the assembly may be installed by threading the same over the threaded portion 32 after having removed the piston head 22 and replacing it by a larger diameter piston to correspond with the bore of the cylinder.

Referring now to FIGS. 10 and 11, there are shown modifications of the triggering mechanism.

In the modification of FIG. 10, the trigger air conduit 108' is secured to a trigger cylinder 128, the air in conduit 108' being permitted to bleed out through bleed aperture 129 in the cylinder 128.

In this embodiment, 130 represents a plunger shiftable within the cylinder 128, the forwardmost end of the plunger 130 lying in advance of the nozzle 81. Accordingly, the plunger tip will contact the subject in advance of engagement of the nozzle against the subject.

As is the case with the slide member 89, the plunger 130 is spring biased to its outward or extended position. Preferably, the spring mechanism may incorporate a variable tensioning device which compresses or releases the spring, thus to vary the force with which the plunger 130 or the slide 89 must be pressed against the subject to trigger an operating cycle. As numerous means of adjusting the spring force may be employed, details of specific spring tension, etc. have been omitted from the drawings.

If the subject is a young chick, a triggering force requiring exertion of a substantial pressure against the chick may injure the animal and hence, the triggering mechanism amd controlling spring bias pressure should be adjusted so that only a minor force against the subject would be needed to seal the bleed aperture.

Conversely, where the apparatus is used for innoculation of a horse, for example, it is desirable that considerable pressure be exerted against the subject before triggering of the apparatus to minimize penetration.

In the modification of FIG. 11, the conduit 108" is vented to the atmosphere at its lead end 131 whereby when the apparatus is pressed against the subject, the body of the subject itself will act as the gasket to close the conduit 108' to build up the requisite back pressure for firing.

It is significant to note that the control circuitry regulating the triggering of an innoculating cycle does not require any electrical sensing means in the innoculating gun per se, the sole connection between the gun and the control member 13 being a non-conductive flexible hose or conduit. The significance of the absence of any electrical connections lies in the fact that even low voltages conducted to the interior of the body of a subject, as from an innoculating stream, may be dangerous or lethal.

It will be seen from the description that a variation in the dosage to be administered may be readily effected by adjustment forwardly or rearwardly of the knurled adjustment collar 43. Since the amount of medicament varies in accordance with the effective volume of chamber 59 and since, in turn, the volume of such chamber is depending upon the stroke of the piston head 57, it is clear that rotation of the collar 43 will effect regulation of the dosage.

It is further clear from an inspection of FIG. 3 that if the knurled adjustment member 43 is threaded so as to shift its position to the left, the piston head 57 may be moved only a short distance to the right, whereby the volumetric capacity of the chamber 59 will be small. In contradistinction, if the adjustment element 43 is threaded to the right, a larger retractile movement of the piston head 57 will be effected, with the result that a larger dosage will be admitted to the chamber 59 and expelled upon leftward shifting movement of the piston. Preferably, index markings signifying the volumetric capacity in cubic centimeters and fractions may be etched into body portion B, visible through window W in the housing, the actual dosage being indicated by the part of the markings uncovered by knurled member 43.

It is an important feature of the device and a further benefit of the slide triggering mechanism that the likelihood of energizing the same to administer a dosage while there is relative movement between the injecting orifice and the subject will be substantially reduced. If the apparatus should be triggered during periods of relative movement, the stream of medicament penetrating the subject would cause the stream to act as a knife. By predicating energizing of the device upon the existence of a predetermined minimum pressure against the subject and by the telescopic relation of the parts which maintains functional contact with the subject notwithstanding minor movements, the possibility of injury are minimized.

The control mechanism may incorporate a time delay relay which prevents recycling of the apparatus before the parts return to their loaded and ready position, which return optionally may be dependent upon a sensing of reduced pressure in conduit 108.

More particularly, when the end 111 of line 108 and the passage 124 are blocked as above described, the resultant back pressure causes an air controlled valve in control box 13 controlling the power circuit 21 to be actuated and also actuates two time delay relays TD, the first insuring that the air pressure will be applied for a given period regardless of whether the trigger means are released and the second preventing a retriggering of the cycle until after the first cycle has been completed.

The control apparatus 13 may include a pressure gauge 132 as well as pressure regulating facilities, which regulating facilities may, in a measure, be employed to vary the pressure with which the stream of medicament is ejected.

From the foregoing it will be seen that there is provided in accordance with the present invention, an improved innoculating apparatus operating with the use of compressed air as a power source. The apparatus includes improved triggering means, initiating an operating cycle responsive to predetermined pressure against the skin of the subject, with the inherent predictability of discharge, rapid sequence of operation and lessened likelihood of inadvertent activation and slippage and consequent trauma. The device may be readily adjusted to administer different dosages and, by changing of the drive cylinder mechanisms, to administer such dosages under a variety of different pressure values.

As noted, the apparatus may be adjusted to administer dosages automatically, i.e., responsive to merely pressing the unit against the subject; semi-automatically, i.e., by pressure against the subject while the trigger is manually depressed, or manually responsive solely to actuation of the trigger. It should be observed that in the automatic semi-automatic modes of operation, dosages can be administered only when the apparatus is actually pressed against the subject with a predetermined force.

A further important feature of the invention lies in the provision in an injector apparatus of the type described of a drive piston and pressure piston connected by a coupling which permits transverse relative movements between the two said pistons. Such construction eliminates undue wear on the seals of the pressure piston of known injectors, resulting in short duty cycles, frequent failures, leakage and insufficient pressure development.

Having thus described our invention, what we claim as new and desire to secure by Letters Patent of the United States is:

1. An injector apparatus comprising, in combination, a body portion, an ejector nozzle mounted at one end of said body portion including a discharge orifice, an exit passage in said body portion leading to said orifice, a liquid reservoir, intermittently actuatable powerized discharge means for expelling liquid from said reservoir into said exit passage for ejection of a given amount of liquid out said orifice, trigger means for actuating said discharge means, said trigger means including a slide member mounted on said one end of said body portion adjacent said orifice for reciprocal movement in the direction of said discharge orifice, said slide member including a trip portion projecting forwardly beyond said orifice to touch the surface to be injected, resilient means biased between said slide member and said body portion for urging said slide member to a forward position, said slide member being shiftable rearwardly from said forward position against the biasing pressure of said resilient means by abutment of the trip portion against the surface to be injected, and sensing means for actuating said discharge means in response to a predetermined rearward movement of said slide member.

2. Apparatus in accordance with claim 1 in which means are provided for regulating the quantity of liquid expelled from said reservoir.

3. Apparatus in accordance with claim 1 in which means are provided to reset the powerized discharge means for actuation by said trigger means for the next discharge cycle.

4. Apparatus in accordance with claim 3 in which means are provided to prevent actuation of said discharge means by actuation of said trigger means until after a previous discharge cycle has been completed.

5. Apparatus in accordance with claim 3 in which means are provided to maintain the discharge means actuated for a complete cycle even if said trigger means are released during such cycle.

6. Apparatus in accordance with claim 3 in which means are provided to maintain the discharge means actuated for a complete cycle even if said trigger means are released during such cycle and means are provided to prevent actuation of said discharge means by actuation of said trigger means until after a previous discharge cycle has been completed.

7. Apparatus in accordance with claim 1 wherein said sensing means includes an air conduit, means for inducing a predetermined air pressure level in said conduit, means for sensing the pressure level in said conduit and activating said discharge means responsive to pressures sensed in said conduit which vary from said level and means on said slide means for varying said pressure in said conduit responsive to predetermined rearward movement of said slide means.

8. The apparatus of claim 7 wherein said means for sensing the pressure in said conduit is remote from said body portion.

9. The apparatus of claim 7 wherein said means for varying said pressure level includes an open end portion on said conduit, and said slide means includes a valve element positioned to engage and seal said open end portion responsive to predetermined rearward movement of said slide.

10. The apparatus of claim 7 wherein said means for inducing said pressure level and said sensing means are remote from said body portion.

11. The apparatus of claim 7 wherein said means for inducing said pressure value comprises a source of air under pressure, and said conduit includes vent aperture means in said body portion, said slide member including a valve element positioned to seal said aperture means responsive to predetermined rearward movement of said slide member, thus to increase the pressure in said conduit.

12. Apparatus in accordance with claim 7 wherein said conduit includes a vent aperture adjacent said slide portion normally discharged to the atmosphere, and said means for varying the pressure in said conduit comprises a closure element positioned to cut off discharge of gas through said vent aperture.

13. The apparatus of claim 12 and including a manual trigger assembly having a trigger, normally open valve means operatively connected to said trigger, said valve means being vented to the atmosphere in the open position thereof and being shut responsive to actuation of said trigger, and a take-off tube connecting said valve means and said conduit and forming a second vent path to the atmosphere in the open position of said valve, whereby the pressure level in said conduit will vary from said level only when said vent aperture is sealed and said valve means is closed.

14. The apparatus of claim 13 and including means on said trigger assembly for holding said valve means in said closed position.

15. The apparatus of claim 13 and including a control member interposed between said slide and said body portion, said control member being shiftable between first and second positions, respectively locking said slide in said rearward position, and permitting said movement of said slide relative to said body portion.

16. In a multi-dose injector apparatus including a body portion, an ejector nozzle mounted at one end of said body portion including a discharge orifice, an exit passage in said body portion leading to said orifice, and powerized means for ejecting measured doses of liquid under pressure through said exit passage and out of the orifice, and means to energize said powerized means, the improvement which comprises a trigger assembly for energizing said powerized means comprising a slide member reciprocately mounted on said body portion and disposed adjacent and projecting forwardly beyond said orifice, said slide being mounted for reciprocation between extended and retracted positions in a path parallel to the axis of said orifice, resilient means biased between said body and said slide and normally urging said slide to said projected position, sensing means for energizing said powerized means responsive to movement of said slide from said extended to said retracted position, the forwardly projecting portion on said slide being adapted to touch the surface to be injected and to shift said slide to said retracted position responsive to pressure against such surface.

17. Apparatus in accordance with claim 16 and including means for varying the pressure necessary to shift said slide.

* * * * *

UNITED STATES PATENT OFFICE
CERTIFICATE OF CORRECTION

Patent No. 3,859,996                    Dated January 14, 1975

Inventor(s) A. Robert Mizzy and Vito L. Pierannunzi

It is certified that error appears in the above-identified patent and that said Letters Patent are hereby corrected as shown below:

In the printed patent, page 1, line 5 identified as

[73] Assignee: Change "Mizzy, Inc., Clifton Forge,

Va." to -- Mizzy, Inc., Clifton Forge, Va., Assignee of the undivided one-half interest of Vito L. Pierannunzi --

Signed and sealed this 18th day of March 1975.

(SEAL)
Attest:

RUTH C. MASON
Attesting Officer

C. MARSHALL DANN
Commissioner of Patents
and Trademarks